(12) United States Patent
Sasai

(10) Patent No.: US 6,408,144 B2
(45) Date of Patent: Jun. 18, 2002

(54) IMAGE FORMING APPARATUS FOR OPERATING UNDER THE OPTIMUM ENVIRONMENT CONDITION

(75) Inventor: Takahiro Sasai, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/815,644

(22) Filed: Mar. 22, 2001

(30) Foreign Application Priority Data

Mar. 29, 2000 (JP) ........................................ 2000-090289

(51) Int. Cl.[7] .............................................. G03G 15/00
(52) U.S. Cl. ............................ 399/44; 399/94; 399/97
(58) Field of Search .............................. 399/44, 67, 97, 399/94, 92

(56) References Cited

FOREIGN PATENT DOCUMENTS

| JP | 070-66923 | 3/1995 | |
|---|---|---|---|
| JP | 8-16073 | * | 1/1996 |
| JP | 08-265470 | | 10/1996 |

* cited by examiner

Primary Examiner—Quana M. Grainger
(74) Attorney, Agent, or Firm—Hogan & Hartson, L.L.P.

(57) ABSTRACT

A facsimile machine performs a printing operation in an optimum environment by detecting the environment of the facsimile machine when it receives a facsimile signal from a remote device. A control circuit assembly (1) of the facsimile machine includes a scanner unit (15), a printing unit (20) and a transmission and reception unit (25). All of them are operated by commands from a main controller (2). A memory (5) that accumulates image information is associated with the main controller (2). If the image information is input into the transmission and reception unit (25), a fan (11) and a heater (12) are operated in accordance with control information stored in a table (31) prepared in the memory (5) until attainment of the operation-assured environment. After that, the printing unit (20) prints the information on sheets of paper. By pressing a button (8), the printing is forcibly output at whatever time.

6 Claims, 4 Drawing Sheets

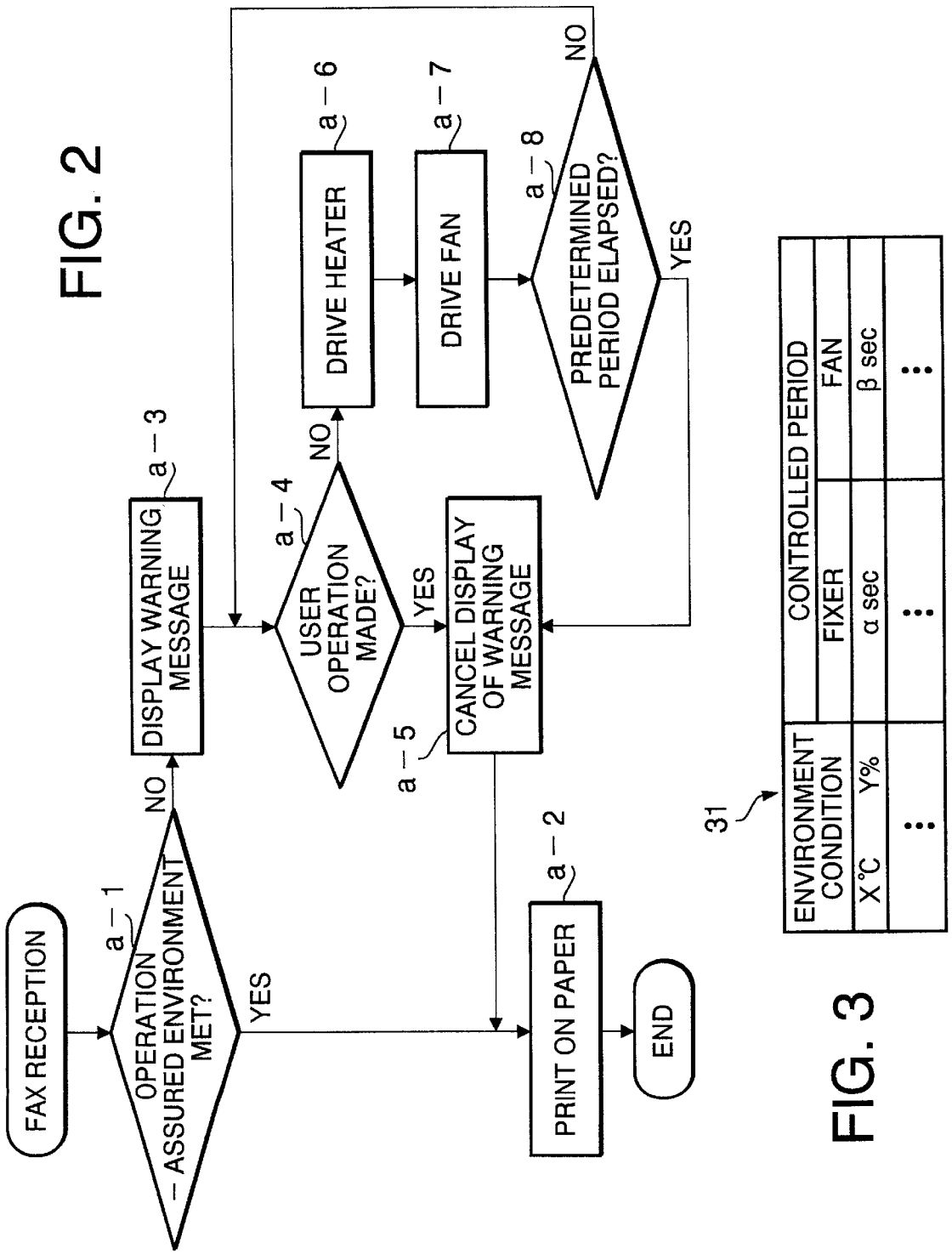

IMAGE FORMING APPARATUS FOR OPERATING UNDER THE OPTIMUM ENVIRONMENT CONDITION

CROSS REFERENCE TO RELATED APPLICATION

The instant application claims priority under 35 USC 119 of Japanese Patent Application No. 2000-90289 filed on Mar. 29, 2000, the entire disclosure of which is incorporated herein by reference.

BACKGROUND OF THE INVENTION

1. Field of the Invention

The present invention relates to an apparatus, like a facsimile, for printing received image information on a sheet of paper, and particularly relates to an apparatus that performs the printing after fulfilling the environmental condition adapted to printing operation. The present invention is also related to an image forming method employing said apparatus.

2. Description of the Related Art

A facsimile machine generally includes a scanning unit to scan an image of a document, a communication unit to transmit and receive image information through telephone lines or cables, and a printing unit to produce the received image information output on a sheet of paper. Like an image forming apparatus using electrophotographic process, said printing unit often employs a transfer device to transfer a toner image to a sheet of paper and a fixing device to fix it. As an electrophotographic copier does, a facsimile machine applying said electrophotographic process uses a method to form an electrostatic latent image by irradiating a photoconductive drum with light in accordance with received image information, to cause a toner to adhere onto the latent image and to transfer a toner image to paper so as to make the printing.

A copier in general is used in limited time and easily able to set the optimum operating condition through the warm-up by switching on in the morning to drive the fix units and by stopping the cooling fan. Meanwhile, since a facsimile machine frequently receives data while nobody is near around like in the night-time, it prints signals without adjusting the environmental condition such as temperature or humidity to the optimum condition for printing, and cannot secure good image quality enough. In order to clear the aforesaid problem of degraded image quality, there is given a proposal to operate the apparatus so as to adapt to the condition appropriate to print when the apparatus receives the facsimile information; however, it sometimes requires long time to secure the optimum condition or occasionally it cannot secure the optimum condition under some environmental condition.

SUMMARY OF THE INVENTION

One object of the present invention is to provide an image forming apparatus that can eliminate the above-described problems.

According to one aspect of the present invention, there is provided an image forming apparatus including a receiving unit to receive image information, a printing unit to print the image information on paper, and a memory to keep the received image information. This image forming apparatus is adapted to keep the received information in the memory if the environment condition is not optimum when it receives the image information. The apparatus sets the optimum condition by driving the apparatus for a predetermined period without printing, and print the image from the memory after that. The printing operation is effected after the optimum condition is attained so that decent printing quality is promised.

The environment condition may be temperature and/or humidity. A heater and/or a fan in the printing unit may be driven to obtain the optimum condition. The apparatus may include a display for indicating a fact that the environment condition is optimum or not.

The received image information may be retrieved from the memory and printed on a sheet if a user directs to print it. The user can direct the printing operation even prior to fulfilling the optimum condition. The use is therefore able to obtain the printed image when he or she wants it.

The received image information may be retrieved from the memory and printed after the image forming apparatus is driven for a prescribed period regardless of a fact that the optimum condition is reached or not. By doing so, it is possible to prevent the received image information from being accumulated in the memory for a long period without printing.

According to another aspect of the present invention, there is provided an image forming method including the steps of receiving image information, accumulating the received image information in a memory, detecting an environmental condition, determining whether the detected environmental condition is an optimum one or not, driving at least one element in an apparatus for a predetermined period if the detected condition is not determined the optimum one, printing the image information accumulated in the memory after the predetermined period elapses or after the detected condition is determined the optimum one.

If a printing command is input by a user, the printing is effected regardless of the detected environment condition.

Additional objects, aspects and advantages of the present invention will become apparent to those skilled in the art to which the present invention relates from the subsequent description of the embodiment(s) and the appended claims, taken in conjunction with the accompanying drawings.

BRIEF DESCRIPTION OF THE SEVERAL VIEWS OF THE DRAWINGS

FIG. 2 is a flowchart showing the operation of the control circuit assembly shown in FIG. 1.

FIG. 3 is a control table employed in the control circuit assembly.

DETAILED DESCRIPTION OF THE INVENTION

Embodiments of the image forming apparatus according to the present invention will. now be described with reference to the accompanying drawings. A facsimile machine is described below as the image forming apparatus.

Figure 1:
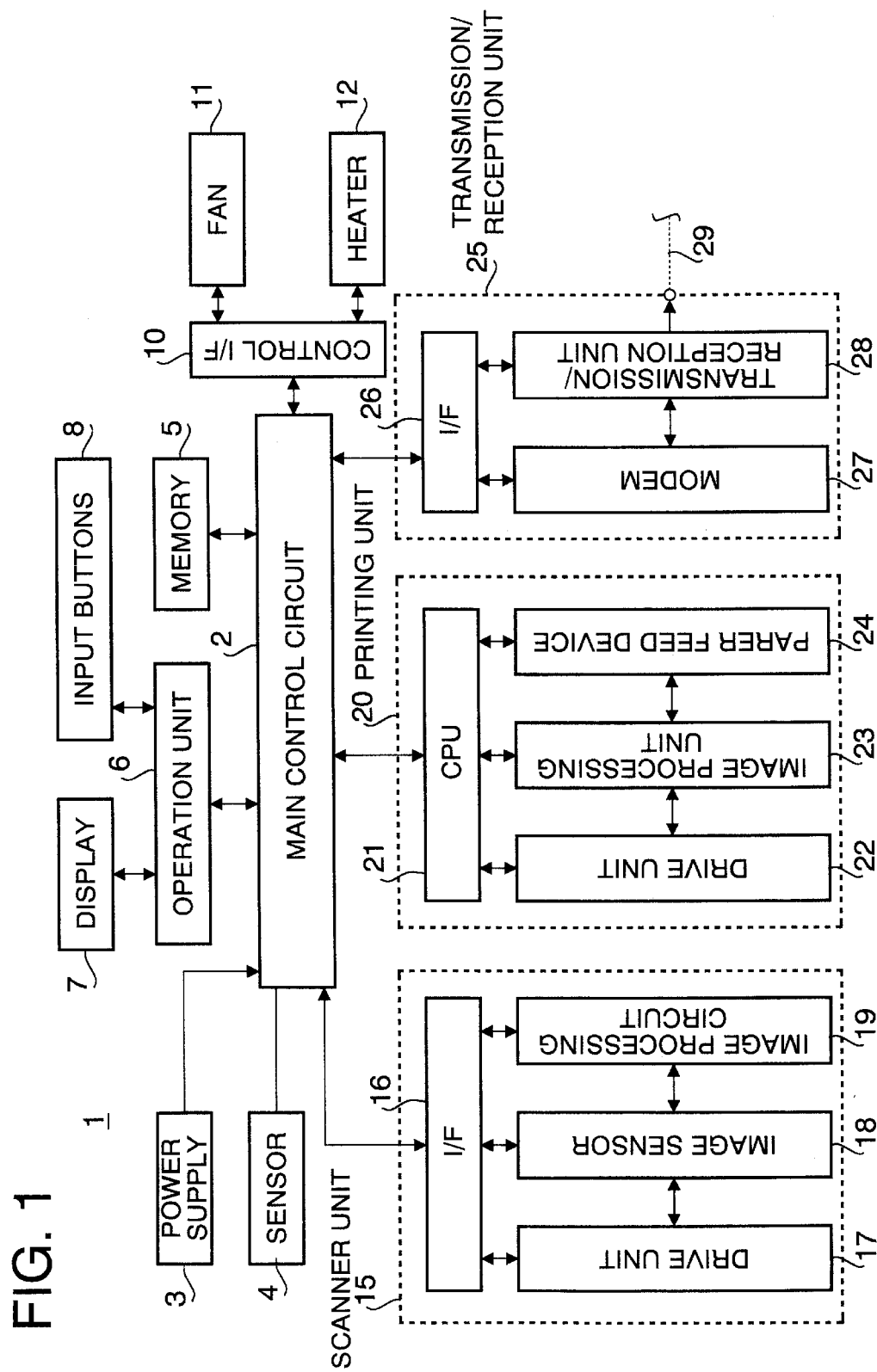
FIG. 1 illustrates a circuit diagram of a control circuit assembly employed in a facsimile machine according to the present invention.

Referring to FIG. 1, illustrated is a structure of a control circuit assembly 1 employed in a facsimile machine. The control circuit assembly 1 includes the following elements, units and devices in order to control these elements and units individually or in cooperation. Specifically, the control unit assembly 1 includes a scanner unit 15 to scan an image of a document, a printing unit 20 to make a copy of the received image, and a transmission and reception unit 25 to transmit and receive the image information through a telephone line 29. A main controller 2 providing individual or cooperative control for each unit connects to a power supply unit 3, a sensor 4, a memory 5, a operation unit 6, and a control interface 10 (hereafter called I/F), and controls every operation in accordance with the control information set in the memory 5. In addition, the memory 5 has a function to accumulate and keep the image information scanned from an image of the document and the received image information. As described below, the main control circuit 2 also has a function of controlling the printing operation on paper by determining whether the environmental condition suits the printing upon receiving image data from a remote facsimile machine.

An operation unit 6 connected to the main control circuit 2 includes a display 7 and a set of input buttons 8. The display 7 displays the operation state of facsimile, the accumulative condition of the received information, and the reserved print on paper. I/F 10 is installed as a control means for a fan 11 and a heater 12 located in the apparatus, and is used to make adjustments to the inside environment of the apparatus in accordance with the outside environment of the apparatus like temperature or humidity measured by the sensor 4 and/or the inside environment of apparatus measured by sensors or detectors installed in the apparatus. The fan 11 has a function to exhaust the inside air of apparatus, and works as an exhaust fan while a copier module in the apparatus is operated. The heater 12 may be a heating roller of a fix unit and the heat emitted from the roller warms the inside of the apparatus. Alternatively, a separate heater may be provided to warm the interior of the apparatus.

A control I/F 16 is installed in the scanner unit 15 of the facsimile machine to control the operation of the scanner unit 15. The control I/F 16 is connected to a drive unit 17 to drive an image sensor 18 and an image processing circuit 19 to process the image information obtained from the image sensor 18. The image information obtained from the image sensor 18 is temporarily stored in the memory 5, so that the information stored in the memory 5 may be transferred to the transmission and reception unit 25 in the case of the transmission over the telephone line 29 by way of the transmission and reception unit 25.

The printing unit 20 has a printing function of a general copier and includes an image processing unit 23 to control the function of image writing onto a photoconductive drum, a paper feed device 24 including a drive means like a roller for paper feeding, and a drive unit 22 to drive the unit and device. The main control circuit 2 controls the unit and device through a control I/F 21 and prints an image on a sheet of paper. The transmission and reception unit 25, including a modem 27 and a transmission and reception circuit 28, is controlled by the main control circuit 2 through a control I/F 26 and transmits and receives the image information over the telephone line 29.

Each function installed in the control circuit assembly 1 is described on the assumption that the function is for a facsimile machine; however, the present invention (control circuit assembly 1) can be employed in an image forming apparatus that is a complex of a copier and a facsimile machine. For instance, in the case that only the function of a copier is operated to print on paper in accordance with the image information scanned from the document, the scanner unit 15 and the printing unit 20 are only caused to operate. In such a case, the operations of the fan 11 and the heater 12 are controlled through the control I/F 10 in order to set the optimum environmental condition for printing and the print operation is performed under the optimum condition.

In the case of the facsimile reception with the control circuit assembly 1, the main controller 2 controls to print on paper in accordance with conditions shown in the flowchart of FIG. 2. As depicted, when a facsimile signal is received, it is determined at Step a-1 whether a current environment condition reaches an operation-assured environment. If the environmental condition is satisfied, the program proceeds to Step a-2 such that a printing operation is carried out and the printed paper is produced. Unless the environmental condition is satisfied at Step a-1, the display 7 shows the warning message at Step a-3, and it is determined at Step a-4 whether a user operation for the printing operation is made or not. If the printing operation is forcefully instructed by the user regardless of the environmental condition, the display of warning message on the display 7 is cancelled at Step a-5 and printing is made on paper at Step a-2.

If the user operation is not set at Step a-4, the heater 12 and the fan 11 are driven at Step a-6 and a-7 respectively. One or both of the heater 12 and the fan 11 are driven for a predetermined period (Step a-8). After the time elapses longer than the predetermined period, which is set in a control table 31 of the memory 5 beforehand, the heater and/or fan is deactivated and the program proceeds to Step a-2 through Step a-5 in order to print on paper. It should be noted that even if the condition is satisfied at Step a-8, the program may not advance to Step a-2 immediately; instead, the printing unit may be kept in a stand by mode until the printing command is input by the user. In that case, the printing operation is performed only when the command of printing (the user operation of Step a-4) is set.

Referring to FIG. 3, illustrated is the control table 31 set in the memory 5, which is used as the control information for the heater 12 at Step a-6 and for the fan 11 at Step a-7. The control table 31 provides the operation time of the fan 11 and the heater (fix unit) 12 with respect to the environmental condition detected by the set of sensors 4. For example, on condition that a temperature is X° C. and the humidity is Y%, the operation time of the fix unit (the heating time of the heat roller) is set as αsec and that of the fan is βsec. If the exact temperature and/or humidity is not indicated in the table 31, the operation times of the fix unit 12 and the fan 11 are decided according to the proportional distribution among the data in the control table. Accordingly, the environmental condition inside the apparatus is automatically set to be the optimum condition for printing. It should be noted that the control table 31 of FIG. 3 is applicable to other embodiments described below.

Figure 4:
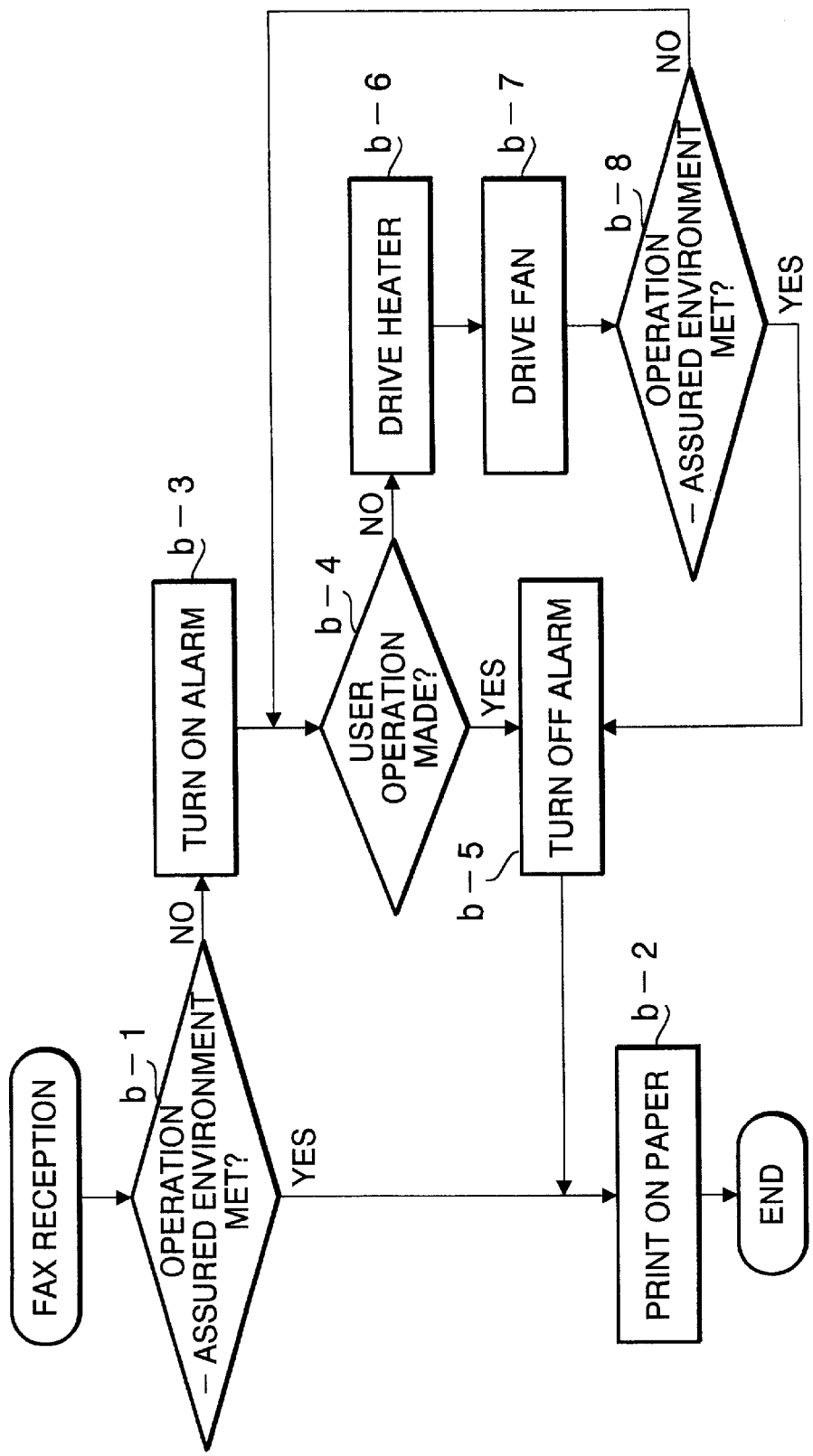
FIG. 4 is similar to FIG. 2 and illustrates a modified operation of the control circuit assembly.

Another embodiment will be described in reference to FIG. 4. Steps b-1 through b-7 are the same as Steps a-1 through a-7 in FIG. 2. After the fan 11 and the fix unit 12 are operated for respective periods, which are determined from the control table 31, Step b-8 determines whether the operation-assured environment is achieved or not. If the inside environment of the apparatus is judged suitable for printing, the alarm message is deleted at Step b-5 and the printing is operated at Step b-2. If Step b-8 concludes that the operation-assured environment is not achieved, the environmental information regarding the inside temperature and humidity of the apparatus on that occasion is measured by the sensor 4, and the operations set in Steps b-6 and b-7 are repeated again during the times that are newly obtained from the control table 31. Thereafter the program proceeds again to Step b-8 to determine whether the operation-assured environment is satisfied. If the answer is yes, the program proceeds to Steps b-5 and b-2.

Figure 5:
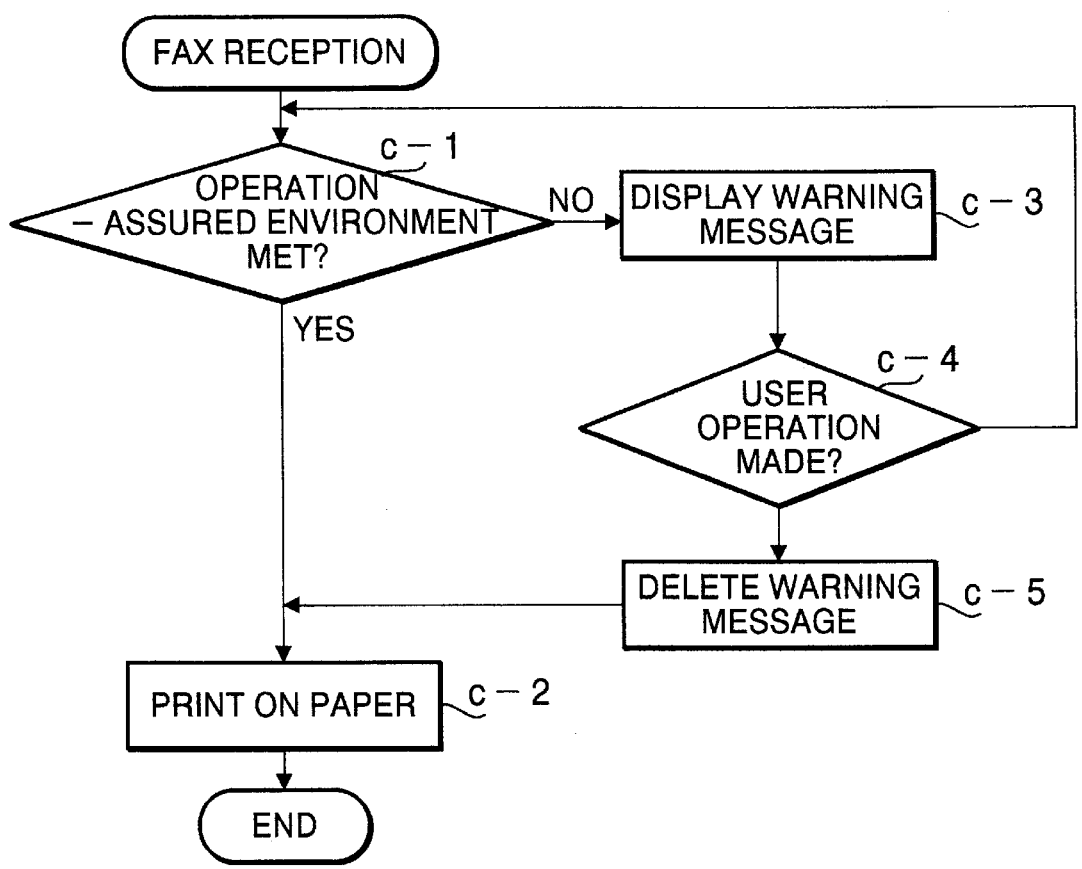
FIG. 5 is also similar to FIG. 2 and shows still another modified operation of the control circuit assembly.

A still another embodiment is illustrated in FIG. 5. According to this flowchart, the received facsimile information is accumulated in the memory 5 if the operation-assured environment is not satisfied at the time of the facsimile information reception, and the printing operation is performed after the user instructs so. Similar to the first and second embodiments, it is determined at Step c-1 whether the operation-assured environment is satisfied or not when the facsimile information is received, and at Step c-2 the printing is carried out if the environment is considered to be the optimum one. When Step c-1 decides that the condition is not met, a warning message is displayed at Step c-3 and the next operation is on hold until the input of user operation at Step c-4. If the user presses the button 8, the warning message is deleted at Step c-5 and the printing is operated at c-2. If the user does not touch the input button 8 at Step c-4, the received facsimile information is kept in the memory 5. However, the printing can be operated at Step c-2 after the satisfaction of the operation-assured environment is detected through the detection of it in Step c-1 at whatever time.

The apparatus can have one or more flowcharts shown in FIGS. 2 to 5, and a user freely can choose one of them for the operation. For example, at an office in the cold latitudes with extremely low ambient temperature in the night time when nobody is there, if the operation of FIG. 5 is selected, it is not necessary to warm up the apparatus and print the facsimile information whenever received, but the apparatus can print the received facsimile information at whatever time after the working time begins in the office and the copier is used. This control contributes to energy savings. The present invention is applicable to a facsimile machine or a complex apparatus which is connected to computers or servers through the network such as LAN if the apparatus prints out the data received from the computers. In such a case, energy savings is also attained.

What is claimed is:

1. An image forming apparatus, comprising:
    a receiving unit to receive image information;
    a printing unit to print the received information onto printing media;
    a memory to memorize the received information;
    a sensor to detect an environmental condition; and
    a control unit to keep the received image information in the memory, drive the printing unit for a predetermined period without printing, and then cause the printing unit to print the image information accumulated in the memory if the environmental condition detected by the sensor is not an optimum condition for printing when image information is received,
    wherein the control unit determines whether the environmental condition is the optimum condition or not in accordance with an output of the sensor after driving the printing unit for the predetermined period, and causes the printing unit to print the image information kept in the memory if the condition is determined optimum, or drives the printing unit for the predetermined period again without printing if the condition is determined not optimum.

2. An image forming apparatus comprising:
    a receiving unit to receive image information;
    a printing unit to print the received information onto printing media;
    a memory to memorize the received information;
    a sensor to detect environmental condition;
    an operation unit to be operated by a user; and
    a control unit to control the printing unit in accordance with the environment condition detected by the sensor, and
    wherein if the environmental condition detected by the sensor is not optimum for printing when image information is received, said control unit keeps the received image information in the memory, and causes the printing unit to print the image information accumulated in the memory after driving the printing unit for a predetermined period without printing or after receiving a print command from the operation unit.

3. The image forming apparatus in claim 2, wherein the sensor is a temperature sensor which detects temperature.

4. A sensor of the image forming apparatus in claim 2, wherein the sensor is a humidity sensor which detects humidity.

5. The image forming apparatus in claim 2, wherein at least one of a fix unit and a fan in the printing unit is driven for the predetermined period.

6. An image forming method, comprising the steps of:
    A) receiving image information and accumulating the received image information in a memory;
    B) detecting an environmental condition;
    C) determining whether the detected environmental condition is an optimum one or not;
    D) driving a printing unit without printing for a predetermined period if the detected condition is not determined the optimum one in the step C); and
    E) printing the image information accumulated in the memory after the step D) finishes or after the step C) determines that the environmental condition is the optimum one,
    wherein the image forming method further includes, after the step D), step F) of detecting the environmental condition again and determining whether the environmental condition is optimum one or not, and if it turns out to be optimum one, proceeding to the step E), but if it does not turn out to be optimum one, proceeding to the step D).

* * * * *